Dec. 11, 1962 D. O. SCHMIDT ET AL 3,068,054
PRESSURE SEALING PISTON AND RING UNIT
Filed Nov. 13, 1961
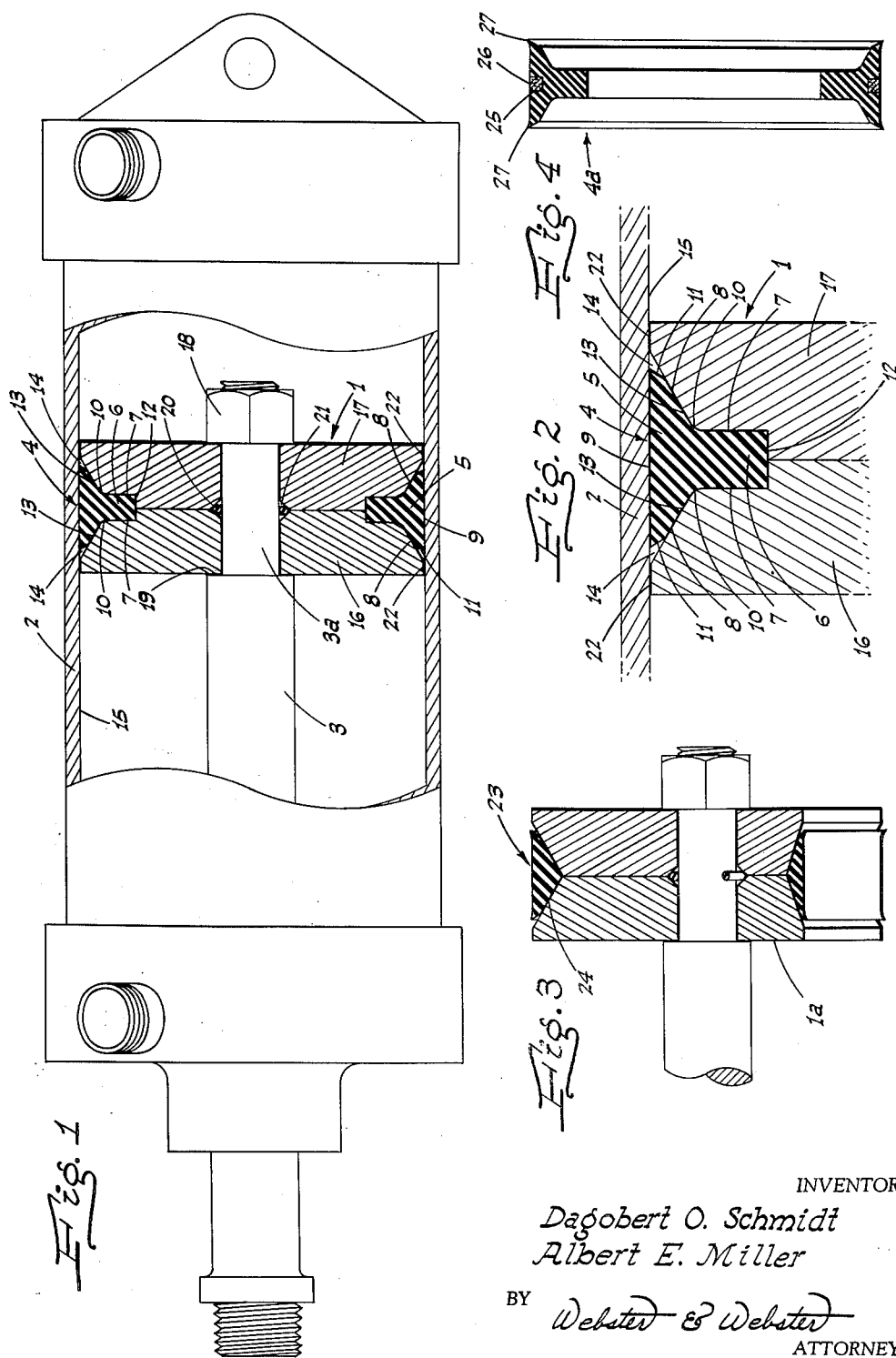
INVENTORS
Dagobert O. Schmidt
Albert E. Miller
BY Webster & Webster
ATTORNEYS

# United States Patent Office 3,068,054
Patented Dec. 11, 1962

3,068,054
PRESSURE SEALING PISTON AND RING UNIT
Dagobert O. Schmidt, 825 S. Orange St., and Albert E. Miller, 413 E. Locust St., both of Lodi, Calif.
Filed Nov. 13, 1961, Ser. No. 151,765
6 Claims. (Cl. 309—20.4)

This invention relates to pistons and the pressure sealing rings incorporated therewith, and particularly to a piston and ring unit intended for use in the cylinders of hydraulic or pneumatic rams and the like rather than in high-temperature installations such as internal combustion engines.

The rings as now generally used for the purpose are of resilient metal, radially split so that their inherent resiliency can be effective in expanding the rings into sealing engagement with the cylinder walls. In order to prevent any leak of pressure past the split, a number of rings are usually mounted on each piston, with the splits thereof circumferentially offset in order to block any pressure leak past the rings as a whole. The rings must be relatively free in their mounting grooves so as not to interfere with the expanding action thereof, and this is of course another source of possible pressure leakage, especially in high-pressure apparatus.

The principal object of our invention is to provide a pressure sealing ring and cooperating piston structure which avoids the objectionable features of metal split rings, and instead employs a single endless or non-split ring of compressible and expansible material and of a special form in cross section, and a piston arranged to receive such ring and providing, with the ring, a means whereby fluid pressure exerted against one end or the other of the piston, when the latter is confined in a cylinder, will cause the adjacent portion of the ring to be expanded and pressed tightly against the cylinder wall throughout the full circumferential extent of the ring, so that pressure leakage past the ring is positively prevented.

A further object of the invention is to provide a ring for the purpose which is of relatively great axial extent and is non-porous, and which is equipped intermediate its ends with a smaller ring of lubricant retaining and absorbing material, thereby making this ring unit particularly adapted for use in pneumatic ram cylinders, in which the pressure fluid is dry and lacks lubricating qualities.

It is also an object of the invention to provide a pressure sealing piston and ring unit which is designed for ease and economy of manufacture.

An additional object of the invention is to provide a practical and reliable pressure sealing piston and ring unit, and one which will be exceedingly effective for the purpose for which it is designed.

These objects are accomplished by means of such structure and relative arrangement of parts as will fully appear by a perusal of the following specification and claims.

In the drawings:

FIG. 1 is a side outline, partly broken out and in section, of a conventional form of hydraulic ram, showing the improved piston and sealing unit mounted therein and in section.

FIG. 2 is an enlarged fragmentary section of the piston and ring unit.

FIG. 3 is a side view, mainly in section, of a modified form of piston and ring unit.

FIG. 4 is a detached sectional elevation of a sealing ring of the general form of that shown in FIGS. 1 and 2, but equipped with a lubricating ring.

Referring now more particularly to the drawings, and to the characters of reference marked thereon—and particularly at this time to the embodiment of the invention shown in FIGS. 1 and 2—the piston 1, which fits and is adapted to reciprocate in the ram cylinder 2, is mounted on the inner end of the piston rod 3 of the ram cylinder.

The improved sealing ring to cooperate with said piston, and indicated generally at 4, is a continuous non-split member made of rubber or any similar flexible and compressible non-porous material. The radially outermost portion 5 of the ring is shorter axially than the axial extent of the piston 1, but such ring extent is somewhat greater than one-half the axial extent of said piston, as shown.

Radially inward from portion 5 the ring is formed with a central rib 6 projecting radially inward, and whose opposed side or end faces 7 are flat and parallel to each other; said rib being considerably narrower axially than portion 5. The radially inner faces 8 of the portion 5 slope radially inward from adjacent the ends thereof to the corresponding ends of the rib at a relatively flat acute angle to the radially outermost face 9 of said ring portion 5; said faces 8 joining the rib faces 7 with relatively small fillets 10.

At the opposed axial ends of the sloping faces 8, which terminate short of the ends of the outer flat face 9, connection between the adjacent ends of said faces is made by means of short angular faces 11, which thus of course deviate radially out from the relatively long faces 8 and are at a greater acute angle to the face 9 than the faces 8.

The piston 1 is peripherally recessed, as at 12, to receive and fit the ring 4 above described; the only difference being that the sloping faces 13 of the recess, which match the sloping faces 8 of the ring, do not engage the short angular faces 11 of the ring, but extend continuously and without deviation to the periphery of the piston, as shown. This leaves circumferentially extending gaps or grooves 14 about the periphery of the piston at both ends of the sealing ring 4; said grooves being of course open and exposed to the cylinder wall 15.

In order to mount the ring 4 in place in the piston 1, said piston is made of two axially separate sections 16 and 17, in each of which one-half of the ring-receiving recess 12 is machined. The sections are supported on the reduced-size end portion 3a of the piston rod 3; a nut 18 on the outer end of said rod portion clamping the piston sections together and against the shoulder 19 formed on rod 3 at the base of the reduced portion 3a thereof. Before thus clamping the piston sections together, a compressible sealing ring 20 is placed about the rod portion 3a and is engaged in compressing relation by the sloping walls of a V-shaped groove 21 formed in the bore of the piston at the junction of the two sections 16 and 17 of the piston, as shown; said ring being squeezed against walls and rod upon the piston sections being clamped together to provide the desired pressure-tight seal between the piston bore and the rod portion 3a.

The ring 4 is of course placed in position in the recess 12 before the piston sections are clamped together—an operation which also causes the rib 6 to be clamped in place to provide an anchor for the radially outermost portion of the ring 4.

In operation, with the sealing ring 4 constructed and mounted as above described, pressure in the cylinder 2 and acting against one end of the piston 1, will pass between the cylinder wall 15 and the short adjacent peripheral face portion 22 of the piston, and will enter the adjacent groove 14. The pressure then engages the adjacent face or wall 11 of the ring 4, and which face forms the back wall of the groove 14 and acts to compress and deform said ring. This will cause the outer face 9 of the ring to be pressingly engaged with the cylinder wall, while at the same time the adjacent sloping face 8 of the ring 4 will be pressingly engaged with the related sloping face 13 of the recess 12. The pressure thus exerted against the ring-end also tends to expand the ring as a whole, particularly as wear develops; the rib 6 then moving radially out slightly from the corresponding confining portion of the recess 12.

The pressure-sealing action of the ring 4 takes place regardless of whether the pressure is applied against one end or the other of the piston, due to the dual or double-ended form of the ring. In connection with the above described construction and operation of the ring, it will be seen that the short and abruptly angled end faces 11 of the ring not only serve to form one side of the grooves 14, but in addition avoid the formation of narrow and weak feather-edge ends on the ring, and which ends would soon wear away or break off.

The above described ring structure is particularly designed for use under low-pressure conditions. For high-pressure service, the ring structure shown in FIG. 3 may be employed. In this case, the ring 23 is a member corresponding in form to the portion 5 of ring 4, and lacking the rib 6 of said ring 4. The ring receiving groove or recess 24 in the piston 1a is thus shaped to correspond to the shape of the ring 23, as shown.

The type of ring shown in FIGS. 1 and 2 is particularly intended for use in hydraulic rams, which are self-lubricating. For use in pneumatic rams or cylinders, the arrangement shown in FIG. 4 is preferably employed. The ring 4a itself in this case is identical with that shown in FIG. 1 and hereinbefore described but is formed with a peripheral, centrally disposed, relatively small circumferential groove 25 in which a full-circle ring 26 of leather or other lubricant absorbing and retaining material is mounted.

In addition, said ring 4a may be formed so that its ends project radially out from the main peripheral face of the ring in the form of sharp-edged angular tips 27 as shown. These of course become flattened down when the piston on which the ring is disposed is mounted in the cylinder. However, said tips—always tending to move radially out—aid in providing the desired sealing action against the cylinder wall. It will be noted that similar tips are shown on the modified form of ring 23, and may also be provided on the ring 4. It may also be noted that in certain cases, as when the pressure is exerted against the piston from one direction only, the special sloped form of the ring may be employed at the pressure end only of the ring.

From the foregoing description it will be readily seen that there has been produced such a device as will substantially fulfill the objects of the invention, as set forth herein.

While this spefication sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A sealing ring and piston unit comprising an endless circular member of compressible and non-porous material, said member having a peripheral face which from end to end flatly contacts the wall of a cylinder upon insertion of said member therein, other faces disposed radially in from said peripheral face sloping toward each other at a relatively small angle to said peripheral face from points short of the ends of the ring, a piston axially longer than and engaged by said ring and having a peripheral recess therein to receive the ring and which includes sloping faces to engage the sloping faces of the ring, and means between the piston and ring forming circumferential grooves in the periphery of the piston at the ends of the ring and of which grooves the ends of the ring form one wall.

2. A unit, as in claim 1, with a centrally disposed rib formed with the ring and projecting radially inward from the adjacent ends of the sloping faces thereof, the piston recess being shaped to receive said rib.

3. A unit, as in claim 2, in which the piston is formed with a pair of axially separate sections clamped against each other and together having the ring receiving recess therein and arranged when so clamped to substantially clamp the rib in place.

4. A sealing ring and piston unit comprising an endless circular member of compressible and non-porous material, said member having a peripheral face which from end to end flatly contacts the wall of a cylinder upon insertion of said member therein, other faces disposed radially in from said peripheral face sloping toward each other at a relatively small angle to said peripheral face from points short of the ends of the ring, a piston axially longer than and engaged by said ring and having a peripheral recess therein to receive the ring and which includes sloping faces to engage the sloping faces of the ring, and additional short faces connecting the adjacent ends of the peripheral face of the ring and said sloping faces thereof and disposed at a relatively abrupt angle to said peripheral face of the ring; the sloping faces of the piston recess extending without deviation to the periphery of said piston whereby to leave peripheral grooves in the piston at the ends of the ring.

5. A sealing ring and piston unit comprising an endless circular member of compressible and non-porous material, said member having a peripheral face which from end to end flatly contacts the wall of a cylinder upon insertion of said member therein, another face disposed radially inward from the peripheral face and sloping at a relatively small acute angle to said peripheral face from a point short of said peripheral face toward the opposite end of the ring, and another face connecting the first named faces at said one end of the ring; a piston axially longer than and engaged by said ring and having a peripheral recess therein to receive the ring and which includes a sloping face to engage the sloping face of the ring, said sloping face of the piston recess extending without deviation to the periphery of the piston.

6. A unit, as in claim 5, in which the ring at said one end is formed with a relatively sharp edged tip of angular cross section initially projecting radially out from the peripheral face of the ring.

References Cited in the file of this patent

UNITED STATES PATENTS

| | | |
|---|---|---|
| 1,569,308 | Smith | Jan. 12, 1926 |
| 1,595,305 | Kibele | Aug. 10, 1926 |
| 1,729,989 | Creighton | Oct. 1, 1929 |
| 1,820,228 | Kibele | Aug. 25, 1931 |